July 24, 1934.  C. C. FARMER  1,967,299
FLUID PRESSURE BRAKE
Filed Feb. 10, 1932
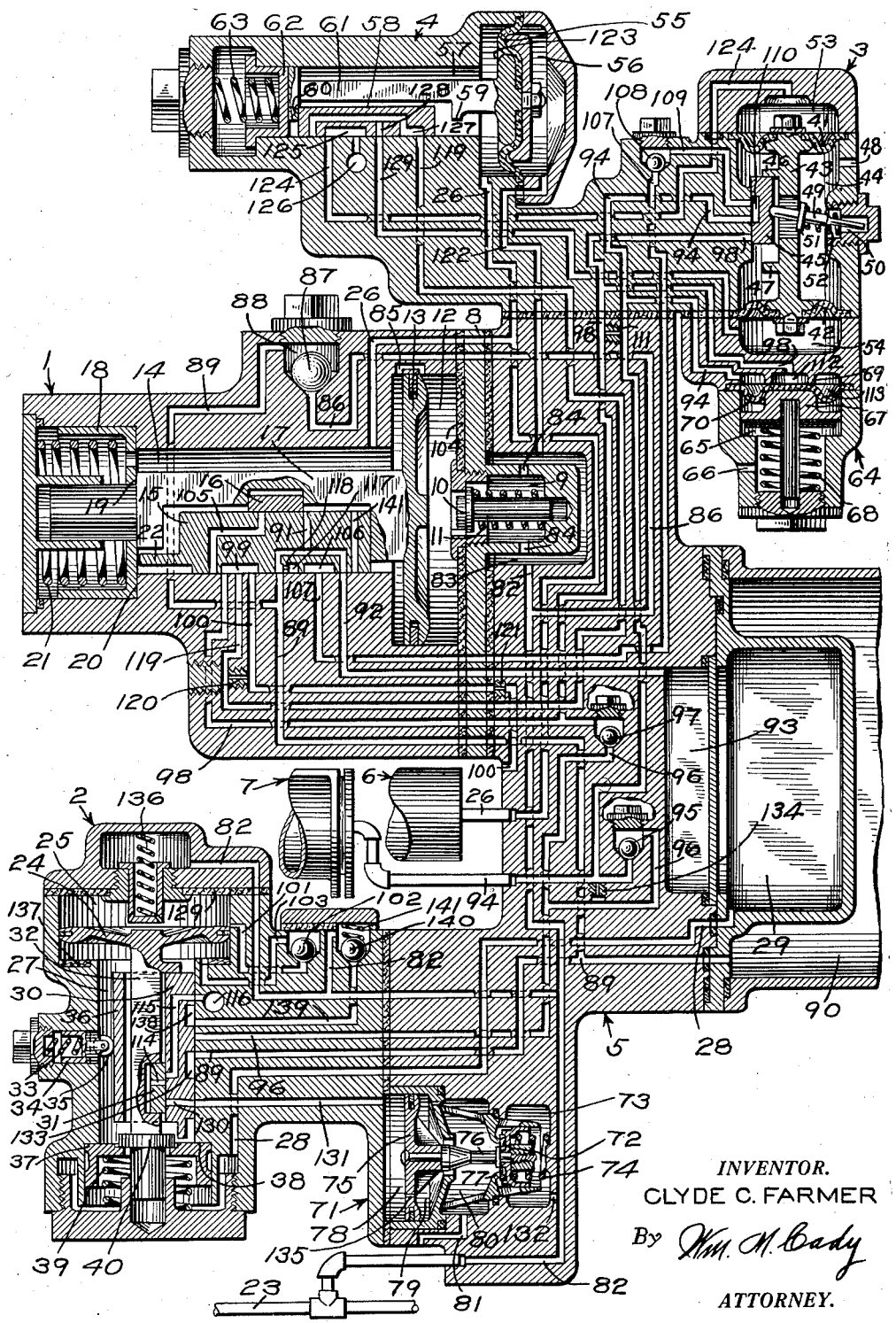
INVENTOR.
CLYDE C. FARMER
By Wm. M. Cady
ATTORNEY.

UNITED STATES PATENT OFFICE 1,967,299

FLUID PRESSURE BRAKE

Clyde C. Farmer, Pittsburgh, Pa., assignor to The Westinghouse Air Brake Company, Wilmerding, Pa., a corporation of Pennsylvania Application February 10, 1932, Serial No. 591,939

6 Claims. (Cl. 303—47)

This invention relates to fluid pressure brakes, and more particularly to the type adapted to operate upon a reduction in brake pipe pressure to effect an application of the brakes and upon an increase in brake pipe pressure to effect a release of the brakes.

There is a continuing tendency to increase the number of cars in a train and consequently increase the length of the train brake pipe through which the train brakes are controlled by variations in fluid pressure.

The brakes on a train are applied serially from the front of the train toward the rear. Due to the lost motion or slack between the cars in the train, the application of brakes on the front portion of the train ahead of applying the brakes on the rear portion of the train, tends to cause the cars in the rear portion of the train to run in on to those at the front of the train and cause excessive and damaging shocks.

One object of my invention is to provide an improved fluid pressure brake equipment for retarding the application of the brakes on the front end of a train, so that the brakes will be applied on the cars at the front end of the train more nearly in synchronism with the application of the brakes on cars at the rear end of the train, so as to obviate the above undesirable condition.

The length of time during which the application of brakes is retarded or delayed at the front of the train should depend upon the time required to obtain an application of the brakes on the rear of the train.

The time required to propagate a sudden or emergency reduction in brake pipe pressure through a train is less than is required to obtain a gradual or service reduction in brake pipe pressure at the rear end of the train and it follows, that in effecting an application of the brakes on the train, the time that the brake application is delayed or retarded at the front of the train may be less when an emergency application of the brakes is effected than when a service application of the brakes is effected.

Another object of my invention is to provide an improved fluid pressure brake equipment for retarding the application of the brakes on the front end of a train for a shorter period of time in effecting an emergency application of the brakes than in effecting a service application of the brakes, so as to obtain, as quickly as possible, effective brakes on the entire train in effecting either a service or an emergency application of the brakes.

A more specific object of my invention is to provide an improved fluid pressure brake equipment operative on cars at the front end of the train, when an application of the brakes is effected, to first cause a quick inshot of fluid to the brake cylinder for moving the brake cylinder piston out past the usual leakage grooves, then retard the flow of fluid to the brake cylinder for a time dependent upon whether a service or an emergency application of the brakes is being effected, and finally, when the brake cylinder pressure is built up to a predetermined degree, increase the rate at which fluid is supplied to the brake cylinder.

Other objects and advantages will appear in the following more detailed description of my invention.

In the accompanying drawing, the single figure is a diagrammatic view of a fluid pressure brake equipment embodying my invention.

As shown in the drawing, the equipment comprises a triple valve device 1, an emergency valve device 2, a selector valve device 3, and a selector pilot valve device 4, said devices being preferably mounted on a pipe bracket 5 to which is connected an auxiliary reservoir 6 and a brake cylinder 7.

The triple valve device 1 comprises a casing between which and the pipe bracket 5 is disposed a filler plate 8, having a chamber 9 containing a plunger 10 subject to the pressure of a spring 11. The filler plate 8 forms one wall of a chamber 12, which is connected to the brake pipe 23 and contains a piston 13. The piston 13 has at the opposite side a valve chamber 14 connected, through passage and pipe 26, to the auxiliary reservoir 6 and containing a main slide valve 15 and an auxiliary slide valve 16, adapted to be operated by a stem 17 carried by said piston. Disposed in the outer end of valve chamber 14 is the usual retarded release mechanism comprising a movable abutment 18, normally pressed into engagement with a shoulder 20 in the casing by means of a spring 21. The outer end of the piston stem 17 freely extends through a suitable aperture in the abutment 18, and is reduced in section to form a shoulder 19, adapted to engage the abutment. The main slide valve 15 is provided with a rearwardly extending finger or projection 22, adapted to engage the abutment 18 at substantially the same time as shoulder 19 on the piston stem 17 engages said abutment.

The emergency valve device 2 comprises a piston 24, having at one side a chamber 25 connected to the brake pipe 23, and at the other side a valve chamber 27, connected by a passage 28 to a quick action reservoir or chamber 29. A main slide valve 30 and an auxiliary slide valve 31 are contained in chamber 27 and adapted to be operated by a stem 32 carried by the piston 24. The main slide valve 30 is pressed into engagement with its seat by means of a spring 33 acting through the medium of a movable plunger 34 carrying a roller 35 engaging the wing 36 of said slide valve.

Disposed in the lower end of valve chamber 27 is a movable abutment 37, which is normally pressed into engagement with a shoulder 38 in the casing by means of a spring 39. The abutment 37 is provided with an aperture through which the outer end of the piston stem 32 freely extends, said aperture being smaller, however, than a collar 40 provided on the piston stem, so that inward movement of the piston 24 and slide valves 30 and 31 from the position shown in the drawing is opposed by the pressure of the spring 39.

The selector valve device 3 comprises two spaced diaphragms 41 and 42 operatively connected together by means of a stem 43. A chamber 44 is formed intermediate said diaphragms and contains a slide valve 45 operatively disposed between two operating lugs 46 and 47 on the stem 43, said chamber being at all times open to the atmosphere through an atmospheric passage 48. The slide valve 45 is pressed into engagement with its seat by means of a rocking pin 49, one end of which extends through an opening in the stem 43 into engagement with a suitable recess in the face of slide valve 45, while the other end projects loosely into a bore 50 in the casing. The rocking pin 49 is provided with an annular collar 51 between which and the casing is disposed a compression spring 52. A chamber 53 is formed at the outer side of the diaphragm 41, while a chamber 54 is formed at the outer side of the diaphragm 42.

The selector pilot valve device 4 comprises a flexible diaphragm 55, having at one side a chamber 56 in constant communication with the brake pipe 23, and having at the other side a valve chamber 57 in constant communication with the auxiliary reservoir 6 and containing a slide valve 58 operatively disposed between two operating lugs 59 and 60 on a stem 61 carried by the diaphragm 55. Disposed in the outer end of valve chamber 57 is a movable abutment 62 adapted to be engaged by the end of the piston stem 61, said abutment being subject to the pressure of a control spring 63.

Associated with the selector valve device 3 is a delay valve device 64 comprising a flexible diaphragm 70, having at one side a chamber 65 open to the atmosphere through a passage 66, and containing a plunger 67 engaging said diaphragm. A spring 68 is interposed between the plunger and casing for urging the diaphragm into engagement with a seat rib 69 formed in the casing.

Disposed in the pipe bracket 5 is a vent valve mechanism 71 comprising a vent valve 72, contained in a chamber 73 communicating with the brake pipe 23, and a piston 75 operatively connected to said vent valve by means of a stem 76 for moving said vent valve out of sealing engagement with a seat rib 77. A spring 74 is provided in chamber 73 for urging said vent valve into sealing engagement with the seat rib 77. The piston 75 has at one side a chamber 78 and at the other side a chamber 79, which is at all times open to the atmosphere past the stem 76 to a chamber 80 and from thence through an atmospheric passage 81.

In operation, to initially charge the brake equipment, fluid under pressure is supplied to the brake pipe 23 in the usual manner and flows from said brake pipe through passage 82 to the vent valve chamber 73, to the emergency piston chamber 25 and to a chamber 83, and from chamber 83 through passages 84 to chamber 9 opening into the triple valve piston chamber 12.

With the triple valve piston 13 in the full release position shown in the drawing, fluid under pressure flows from chamber 12 through a feed passage 85 to valve chamber 14 and from thence through passage 26 to the auxiliary reservoir 6 and to valve chamber 57 of the pilot valve device 4.

Fluid under pressure also flows from the brake pipe passage 82 through a passage 86 to the lower side of a check valve 87, which is moved from its seat to permit fluid under pressure to flow to chamber 88 and from thence through passage 89 to an emergency reservoir 90.

The emergency reservoir passage 89 leads to the seat of the triple valve slide valve 15 and with said slide valve in the full release position shown in the drawing, a port 91 in said slide valve connects passage 89 to valve chamber 14 to permit the pressures in the auxiliary reservoir 6 and emergency reservoir 90 to equalize. Port 91 also registers with a passage 92 connecting to an inshot reservoir 93, so that said inshot reservoir is charged with fluid under pressure upon charging the auxiliary reservoir and emergency reservoir.

With the triple valve device in release position, the brake cylinder 7 is vented to the atmosphere through pipe and passage 94, past a check valve 95, through a passage 96, past a check valve 97, through passage 98, a cavity 99 in the triple valve slide valve 15 and an atmospheric passage 100.

With the emergency valve device 2 in the normal or release position, as shown in the drawing, fluid supplied from the brake pipe through passage 82 to the piston chamber 25 flows through passage 101, past a check valve 102, and through passage 103 to the emergency valve chamber 27, and from thence through passage 28 to the quick action reservoir 29, thereby charging said reservoir to brake pipe pressure.

According to my invention, the selector valve devices 3 in the train are set to their operating positions, according to their location in the train, by utilizing the condition that the triple valve devices on cars at the head end of the train move to one position in releasing the brakes, after an application has been made, due to the more rapid increase in brake pipe pressure at the head end of the train, and to another position on cars at the rear of the train where the rate of increase in brake pipe pressure is relatively slow.

Before the train starts out on a run, it is the practice, after the brake system has been duly charged with fluid under pressure, to first effect an application of the brakes and then a release of the brakes, in order to ensure that the brakes are in proper working condition, so that with my improved apparatus applied to the train, the selector valve devices will be set to their desired operating positions, according to their position in the train, when the above usual procedure is followed in starting out on a run.

The brake equipment being initially charged, a gradual reduction in brake pipe pressure is effected in the usual manner to cause a service application of the brakes, and consequently fluid is vented from the triple valve piston chamber 12.

The triple valve piston 13 is thereupon operated by the higher auxiliary reservoir pressure in valve chamber 14 to move the slide valves 15 and 16 to application position. In thus moving to application position, the piston initially moves the auxiliary slide valve 16 relative to the main slide valve 15, so as to open port 105 to valve chamber 14. Further movement of the piston 13 then shifts the main slide valve 15 to application position in which port 105 registers with passage 98, and in which a cavity 106 connects the inshot reservoir passage 92 to a passage 107. Movement of the triple valve parts ceases in application position, due to the piston 13 engaging a gasket 104.

Assuming the selector valve device 3 to initially be in the position shown in the drawing, fluid under pressure is permitted to flow from inshot reservoir 93 through passage 92, cavity 106 in the triple valve slide valve 15, passage 107, past check valve 108, through passage 109, cavity 110 in the selector slide valve 45, and passage 94 to the brake cylinder 7. At the same time, fluid under pressure is supplied from the triple valve chamber 14 and connected auxiliary reservoir 6 to the brake cylinder 7 through the service port 105 in the triple valve slide valve 15, passage 98, choke plug 111, and passage and pipe 94, thereby applying the brakes.

Diaphragm chamber 56 of the pilot valve device 4 being connected to the brake pipe through passage 122, chamber 83 and passage 82, the diaphragm 55 is deflected outwardly by auxiliary reservoir pressure in valve chamber 57, upon a reduction in brake pipe pressure. This deflection is limited by engagement of the diaphragm stem with the casing and is adapted to move the slide valve 58 toward the right hand. Then when the auxiliary reservoir pressure in valve chamber 57 is reduced by flow to the brake cylinder to substantially brake pipe pressure in chamber 56, the stress in the diaphragm 55 returns said diaphragm and the stem 61 to the normal position, this return movement being relative to the slide valve 58 and ceasing when lug 59 engages the end of said slide valve.

Further description of how the brakes are applied with my improved equipment will be deferred, since it is desired to first describe how the selector valve devices are set in releasing the brakes following an application of the brakes.

The triple valve device being in application position, as above described, the brake pipe pressure is increased in the usual manner to effect a release of the brakes.

In effecting a release of the brakes, particularly on a long train, it is customary to initially supply fluid at the high pressure carried in the usual main reservoir (not shown) directly to the brake pipe, and then after a certain lapse of time the supply of fluid to the brake pipe is at a lower pressure as governed by the usual feed valve device (not shown). As a result, the brake pipe pressure on cars near the front of the train is initially increased rapidly and to a high degree relative to the increase in brake pipe pressure on cars toward the rear of the train.

The rapid increase in brake pipe pressure on cars in the front portion of the train causes the triple valve piston 13 to be shifted to the retarded release position, compressing spring 21, the retarded release position being defined by engagement of the piston 13 with the casing.

In retarded release position, the feed groove 85 is closed, but fluid is supplied from the normally charged emergency reservoir 90 to the triple valve chamber 14 and auxiliary reservoir 6 by way of passage 89, cavity 117 in the triple valve slide valve 15, choke 118, and passage 91 in said slide valve. When the pressure in the emergency reservoir passage 89 becomes reduced to below brake pipe pressure, fluid then flows from the brake pipe 23 to said passage by way of check valve 87 in the manner hereinbefore described. From valve chamber 14, fluid flows through port 141 in slide valve 15 to passage 92 communicating with the inshot reservoir 93, so that said reservoir is charged with fluid under pressure as the auxiliary reservoir 6 is charged.

In retarded release position of the slide valve 15, the atmospheric passage 100 is lapped by said slide valve, and fluid under pressure is vented from the brake cylinder 7 to the atmosphere at a restricted rate by way of pipe and passage 94, past the check valve 95, through passage 96, past check valve 97, through passage 98, cavity 99 in the triple valve slide valve 15, through passage 119, retarded release choke plug 120, and passage 100.

Fluid supplied from the brake cylinder to cavity 99 in the triple valve slide valve 15, in effecting a release of the brakes, also flows from said cavity through passage 119 to the seat of the pilot valve slide valve 58.

In effecting a release of the brakes, the rapid increase in brake pipe pressure in chamber 56 of the pilot valve device on cars at the head end of the train, deflects the diaphragm 55 inwardly from its normal position against the opposing auxiliary reservoir pressure in valve chamber 57 and the added opposing pressure of spring 63, said deflection being limited by engagement of the enlarged portion 123 of the stem 61 with the casing. The slide valve 58 is thereby moved by the operating lug 59 from the position to which it was moved in effecting an application of the brakes to the position shown in the drawing.

With the slide valve 58 in the position shown in the drawing, diaphragm chamber 53 of the selector valve device is vented to the atmosphere through passage 124, cavity 125 in said slide valve and an atmospheric passage 126. Passage 119, to which fluid is supplied from the brake cylinder through cavity 99 in the triple valve slide valve 15, is connected by way of ports 127 and 128 in the slide valve 58 to a passage 129 leading to diaphragm chamber 54 of the selector valve device, so that fluid is supplied from the brake cylinder to said chamber.

Since diaphragm chamber 53 of the selector valve device is vented to the atmosphere, the pressure of fluid from the brake cylinder in chamber 54 deflects diaphragms 42 and 41 upwardly until the upper end of the stem 43 engages the casing. The consequent upward movement of the diaphragm connecting stem 43 is adapted to shift the slide valve 45 upwardly to the position shown in the drawing, unless said slide valve is already in the upper position as it may be at the time the release of the brakes is effected.

The pressure of fluid in diaphragm chamber 54 reduces as the brake cylinder pressure is reduced, and when reduced to a predetermined degree, the stress of the diaphragms 41 and 42 returns said diaphragms and the stem 43 to their normal or neutral position. The movement of the diaphragms 41 and 42 of their normal position is, however, relative to slide valve 45, due to the lost motion between the stem 43 and the slide valve, so that the slide valve remains in the position shown in the drawing. In the normal position of the diaphragms and stem, the lug 46 on said stem just engages the upper end of the slide valve.

When the pressure in the triple valve chamber 14 substantially equalizes with the brake pipe pressure in piston chamber 12, the retarded release spring 21 shifts the triple valve parts to full release position as shown in the drawing, in which position the brake equipment is fully charged to brake pipe pressure in the same manner as in initially charging the equipment.

In the pilot valve device, when the auxiliary reservoir pressure in valve chamber 57 is increased to within a predetermined degree of the brake pipe pressure acting in chamber 56, spring 63 returns the diaphragm 55 and stem 61 to their normal position, in which position the operating lug 60 on the stem 61 just engages the left hand end of the slide valve 58, said slide valve thus remaining in its left hand position, as shown in the drawing.

In the rear portion of the train, the relatively slow rate of increase in brake pipe pressure shifts the triple valve parts only to full release position as shown in the drawing, in which the feed groove 85 around the piston 13 is uncovered to permit flow of fluid from the brake pipe to the valve chamber 14, and fluid is vented from the brake cylinder by way of cavity 99 in the triple valve slide valve 15. From cavity 99 fluid from the brake cylinder is also supplied to passage 119 leading to the seat of the pilot valve slide valve 59.

In the rear portion of the train, the rate of increase in brake pipe pressure in diaphragm chamber 56 of the pilot valve device is insufficient to deflect the diaphragm 55 against the opposing increasing auxiliary reservoir pressure in valve chamber 57 and the added pressure of spring 63, and as a result, the slide valve 58 remains in its right position, to which position it was moved by lug 60 in effecting an application of the brakes.

With the pilot valve slide valve 58 in the right hand position, to which it was moved as just described, diaphragm chamber 54 of the selector valve device is vented to the atmosphere through passage 129, cavity 125 in the pilot valve slide valve 58, and atmospheric passage 126, while fluid from the brake cylinder is supplied from passage 119 to diaphragm chamber 53 by way of port 127 in the pilot valve slide valve 58, and passage 124. The selector valve diaphragms 41 and 42 and stem 43 are thereby moved downwardly by the pressure of fluid in chamber 53, and if the slide valve is not already in its lower position, such downward movement of the stem 43 causes lug 46 to shift the slide valve 45 to the lower position in which the cavity 110 connects passages 94 and 98. Then upon a substantially complete release of fluid from the brake cylinder and diaphragm chamber 53, the diaphragms 41 and 42 and stem 43 return to their neutral position shown in the drawing, in which position lug 47 just engages the end of the slide valve.

In the manner above described, the selector valve devices on the train are conditioned for controlling an application of the brakes on the train after leaving the terminal, the selector valve slide valves 45 being in the position shown in the drawing on cars at the front portion of the train and being in the lower position, in which cavity 110 connects passages 94 and 98, on cars at the rear portion of the train.

Now, if it is desired to effect a service application of the brakes, a gradual reduction in brake pipe pressure is effected, and consequently a corresponding reduction occurs in the triple valve piston chamber 12, emergency valve piston chamber 25, and pilot valve diaphragm chamber 56.

The triple valve piston 13 is thereupon operated by the higher auxiliary reservoir pressure in valve chamber 14 to move the slide valves 15 and 16 to application position in which the inshot reservoir 93 is connected through passage 92, cavity 106 in the triple valve slide valve 15, passage 107, past the check valve 108, and through passage 109 to the seat of the selector valve slide valve 45. Also in application position of the triple valve device, fluid under pressure is supplied from the auxiliary reservoir through the service port 105 in the triple valve slide valve 15 to passage 98 leading to the seat of the selector slide valve 45.

In the front portion of the train, where the selector slide valve 45 is positioned as shown in the drawing, fluid from the inshot reservoir rapidly flows from passage 109, through cavity 110 in the selector slide valve 45 to passage 94 leading to the brake cylinder, and since passage 98 is lapped by the selector slide valve, fluid supplied through service port 105 in the triple valve slide valve 15 to passage 98, flows from passage 98 through choke plug 111 to passage 94 and then to the brake cylinder. Thus, in the front portion of the train, there is a rapid flow or inshot of fluid under pressure from the inshot reservoir to the brake cylinder and at the same time and continuing after equalization of pressures in the inshot reservoir and brake cylinder, fluid is supplied from the auxiliary reservoir to the brake cylinder at a slower rate as controlled by the choke plug 111.

Fluid under pressure supplied from the auxiliary reservoir 6 to the passage 98 also flows to a chamber 112 formed within the seat rib 69, which is engaged by the delay valve diaphragm 70. Fluid under pressure from the brake cylinder passage 94 flows to chamber 113 outside of the seat rib 69, so that when the brake cylinder pressure and consequently the pressure in chamber 113 has been built up to a predetermined degree, the opposing pressure of spring 68 is overcome, and the diaphragm 70 is deflected away from the seat rib 69, thereby connecting passage 98 to the brake cylinder passage 94, so as to provide a by-pass around choke plug 111 and thus permit fluid to be supplied from passage 98 to passage 94, and from thence to the brake cylinder at a more rapid rate than through the choke plug 111.

In the rear portion of the train where the selector slide valve 45 is in its lower position, the inshot reservoir passage 109 is lapped so that there is no rapid inshot of fluid to the brake cylinder as occurs in the front portion of the train. Passage 98 being connected directly to the brake cylinder passage 94 through cavity 110 in the selector slide valve, opens a by-pass around the choke plug 111, through which by-pass fluid is supplied directly from the auxiliary reservoir to the brake cylinder at a substantially constant rate. The delay valve device operates in the rear portion of the train in the same manner as in the front portion of the train, but its operation is unnecessary, due to the direct and unchoked communication established between passages 94 and 98 through cavity 110 in the selector slide valve.

It will now be noted that the brakes in the front portion of the train are applied at three different rates, there being the initial rapid, but limited, supply of fluid from the inshot reservoir 93, which is merely adapted to move the piston (not shown) in the brake cylinder 7 out past the usual leakage grooves and bring the brake shoes into engagement with the car wheels. The initial inshot of fluid to the brake cylinder is followed by the gradual supply through choke plug 111, said gradual supply being adapted to apply the brakes at a relatively slow rate for causing the slack in the train to run in and gather without harsh shock, after which the delay valve device 64 operates to increase the rate at which fluid is supplied to the brake cylinder for providing effective braking power to control the train. As the brake cylinder pressure is increased after substantial equalization of fluid from the inshot reservoir into the brake cylinder, a check valve 108 isolates the inshot reservoir and prevents fluid flowing from the brake cylinder to said reservoir.

The full application of brakes in the rear portion of the train is effected at a relatively rapid rate, since the flow of fluid to the brake cylinder is not at any time restricted as at the head end of the train, this being desirable in order to obtain brakes in the rear portion of the train as quickly as possible to aid in preventing a harsh gathering of the slack.

When a gradual reduction in brake pipe pressure is effected, the emergency piston 24 is actuated by the pressure of fluid in valve chamber 27 to move the auxiliary slide valve 31 relative to the main slide valve 30, so as to bring a vent port 114 into registry with a port 115 in the main slide valve and permit fluid to be vented from the valve chamber 27 and connected quick action chamber 29 to the atmosphere by way of said ports and an atmospheric passage 116. The rate of such venting is adapted to reduce the pressure in valve chamber 27 at substantially the same rate as the brake pipe pressure is reduced in chamber 25, so that further outward movement of the piston 24 ceases. Then, when the pressure in valve chamber 27 is reduced to slightly below the brake pipe pressure in piston chamber 25, the piston 24 and auxiliary slide valve 31 are returned to their normal position as shown in the drawing, so that in effecting a release of the brakes, the valve chamber 27 and quick action chamber 29 will be charged to brake pipe pressure as hereinbefore described.

Upon a reduction in brake pipe pressure the pilot valve diaphragm 55 is deflected towards the right into engagement with the casing. In the front portion of the train, the consequent movement of the diaphragm stem 61 shifts the slide valve 58 to its right hand position, but in the rear portion of the train, where said slide valve is positioned in its right hand position, the movement of stem is merely relative to said slide valve. Then when the auxiliary reservoir pressure becomes reduced to substantially equal brake pipe pressure in diaphragm chamber 56, the stress of diaphragm 55 returns same and the stem 61 to their normal position, in which lug 59 just engages the right hand end of the slide valve 58.

If it is desired to effect a release of the brakes after a service application, the brake pipe pressure is increased in the usual manner. In the front portion of the train, the consequent rapid increase in pressure in the triple valve piston chamber 12, causes piston 13 to move the triple valve parts to retarded release position in which fluid under pressure is supplied from the emergency reservoir 90 to valve chamber 14 and the auxiliary reservoir 6 by way of passage 89, cavity 117, choke 118, and passage 91 in the slide valve 15. From valve chamber 14, fluid flows through port 141 in slide valve 15 and passage 92 to the inshot reservoir 93. When the pressure in the emergency reservoir 90 is thus reduced to below brake pipe pressure, fluid flows from the brake pipe to said reservoir by way of check valve 87. When the pressure in valve chamber 14 is increased to substantially brake pipe pressure, the retarded release spring 21 moves the triple valve parts to full release position, in which further charging of the auxiliary reservoir is accelerated by flow from the brake pipe through the feed groove 85.

Fluid under pressure is released from the brake cylinder in retarded release position of the triple valve device by way of passage 94, past check valve 95, through passage 96, past check valve 97, through passage 98, cavity 99 in the triple valve slide valve 15, through passage 119, retarded release choke 120, and from thence through passage 100. When the triple valve parts move to full release position, further venting of fluid from the brake cylinder occurs from cavity 99 directly through passage 100 containing the full release choke plug 121.

In the rear portion of the train, the triple valve devices are merely moved to full release position by the relatively slow increase in brake pipe pressure at the rear of the train, and in said position, the auxiliary reservoir 6, emergency reservoir 90 and inshot reservoir 93 are charged with fluid under pressure, and fluid under pressure is vented from the brake cylinder 7 in the same manner as hereinbefore described.

The pilot valve devices 4 in the front and rear portions of the train are operated by the increase in brake pipe pressure in diaphragm chamber 56 to supply fluid under pressure from the brake cylinder to either diaphragm chamber 53 or diaphragm chamber 54 of the selector valve device 3, in accordance with the location of the selector valve device in the train, in the same manner as in releasing the brakes after an application during the terminal test. The selector valve diaphragms 41 and 42 are deflected by the fluid supplied to either chamber 53 or 54, but the deflection of said diaphragms is merely relative to slide valve 45, which was properly positioned in the train in conditioning the brake equipments in the train for service operation.

In effecting a release of the brakes, fluid under pressure supplied from the brake pipe to the emergency piston chamber 25 flows through passage 101, past the check valve 102, and through passage 103 to the emergency valve chamber 27 and from thence through passage 28 to the quick action chamber 29, thus charging said chamber to brake pipe pressure.

When a sudden reduction in brake pipe pressure is made to effect an emergency application of the brakes, the triple valve device 1 operates in the same manner as in effecting a service application of the brakes.

In the front portion of the train, fluid under pressure from the inshot reservoir 93 is supplied to the brake cylinder at a rapid rate by way of cavity 110 in the selector slide valve 45, while at the same time fluid from the auxiliary reservoir 6 flows to the brake cylinder at a restricted rate through the choke 111.

In addition, the sudden reduction in brake pipe pressure in the emergency piston chamber 25 permits the pressure of fluid in valve chamber 27 to move the piston 24 and slide valves 30 and 31 outwardly to emergency position, in which position the piston 24 engages the gasket 129. The piston 24 initially moves the auxiliary slide valve 31 relative to the main slide valve 30 and opens port 130 in the main slide valve to valve chamber 27, which permits fluid from valve chamber 27, and consequently from the quick action reservoir 29, to flow to passage 131 leading to the vent valve piston chamber 78. Further movement of the emergency piston 24 to emergency position then shifts the main slide valve 30 and opens passage 131 directly to valve chamber 27, so that fluid continues to be supplied to the vent valve piston chamber 78.

The pressure of fluid supplied to piston chamber 78, operates the piston 75 to unseat the vent valve 72, which permits fluid to rapidly flow from the brake pipe 23 to the atmosphere by way of passage 82, passage 132, chamber 73, past the vent valve to chamber 80 and from thence through atmospheric passage 81. The sudden reduction thus effected in brake pipe pressure is adapted to serially transmit quick emergency action through the train in the usual well known manner.

In emergency position of the emergency slide valve 30, a cavity 133 connects passage 89 from the emergency reservoir 90 to passage 96. Fluid from the emergency reservoir is thus permitted to flow to passage 96 and from thence through a choke plug 134 and passage and pipe 94 to the brake cylinder 7. At the same time fluid is being supplied from the auxiliary reservoir 6 to the brake cylinder through choke plug 111, so that the brake cylinder pressure increases at a rate governed by the combined flow capacities of the two choke plugs 111 and 134.

When the brake cylinder pressure is built up to a predetermined degree, the delay valve device 64 operates, in the same manner as in effecting a service application of the brakes, to connect passages 98 and 94 so as to provide a by-pass around the choke plug 111, through which fluid is supplied from the auxiliary reservoir to the brake cylinder at a faster rate. Fluid from the emergency reservoir is permitted to flow from passage 96 past the check valve 97 to passage 98, so that upon operation of the delay valve device, the choke plug 134 is also by-passed and fluid from both the auxiliary reservoir 6 and emergency reservoir 90 is supplied to the brake cylinder by way of passage 98, past the delay valve diaphragm 70 and then through passage and pipe 94.

It will now be noted that in effecting an emergency application of the brakes, the supply of fluid to the brake cylinder at the head end of the train is in three stages as in effecting a service application of the brakes, but the rate of build up of brake cylinder pressure in effecting an emergency application is faster than in effecting a service application, since fluid flows from the emergency reservoir through the choke 134 to the brake cylinder as well as from the auxiliary reservoir through choke 111 to the brake cylinder. As a consequence, the degree of fluid pressure required to operate the delay valve device 64 is obtained in a shorter period of time than is the case in effecting a service application of the brakes. Also, since in effecting an emergency application of the brakes the emergency reservoir pressure, as well as auxiliary reservoir pressure, is permitted to equalize into the brake cylinder, a higher brake cylinder pressure is obtained than it is possible to obtain in effecting a service application of the brakes, at which time the emergency reservoir is isolated.

In the rear portion of the train, the rate of supply of fluid to the brake cylinder in effecting an emergency application of the brakes is not restricted by flow through chokes, as is the case at the head end of the train, for the reason that the selector valve slide valve is in the lower position in which cavity 110 connects passages 98 and 94 and consequently provides a by-pass around the choke plugs 111 and 134. As a result, fluid supplied from the auxiliary reservoir to passage 98 by operation of the triple valve device and from the emergency reservoir to passage 96 and past check valve 97 to passage 98 by operation of the emergency valve device, flows from passage 98, through cavity 110 in the selector valve slide valve 45 to passage 94, and from thence to the brake cylinder 7, a high emergency pressure being obtained in the brake cylinder due to equalization of fluid from both of said reservoirs into the brake cylinder.

The check valve 97 is provided between passages 98 and 96, through which fluid is supplied from the emergency reservoir to the brake cylinder in effecting the emergency application of the brakes, in order to prevent fluid, supplied from the auxiliary reservoir to passage 98 by the triple valve device, from flowing to passage 96 and thence through choke plug 134 to the brake cylinder in effecting a service application of the brakes.

Fluid supplied from the emergency valve chamber 27 and connected quick action reservoir 29 to the vent valve piston chamber 78 to operate the piston 75 to unseat the vent valve 72, is exhausted through a vent port 135 in said piston to chamber 79 and from thence through chamber 80 and passage 81 to the atmosphere. When the pressure in chamber 78 is thus reduced to below the opposing pressure of spring 74, said spring seats the vent valve 72 so as to close the atmospheric communication to the brake pipe, for permitting the brake pipe to be charged with fluid under pressure for effecting a release of the brakes, when desired.

To effect a release of the brakes after an emergency application, the brake pipe pressure is increased in the usual manner. Since the quick action reservoir 29 and valve chamber 27 of the emergency valve were vented to the atmosphere during an emergency application of the brakes, the brake pipe pressure, when it is increased to some low degree, such for example as seven pounds, shifts the emergency piston 24 and associated slide valves 30 and 31 to their innermost or back dump position against the opposing pressure of spring 39, in which position the piston 24 engages the gasket 137. At this time the triple valve piston 13 and associated slide valves 15 and 16 are still maintained in application position by auxiliary reservoir pressure in valve chamber 14, which is much higher than the low brake pipe pressure acting in piston chamber 12.

With the emergency slide valve 30 in back dump position, the emergency reservoir passage 89 is lapped. Said passage is also lapped by the triple valve slide valve 15, so that the emergency reservoir 90 is bottled up. Further, with the slide valve 30 in back dump position, the brake cylinder 7 is connected to the brake pipe 23 through pipe and passage 94, past check valve 95, through passage 96, a cavity 138 in said slide valve, passage 139, past a check valve 140 and through passage 82. The triple valve device being in application position, the auxiliary reservoir 6 is still in communication with the brake cylinder, and with said brake cylinder open to the brake pipe, fluid flows from the auxiliary reservoir and brake cylinder to the brake pipe so as to assist in charging the brake pipe, and due to reducing the auxiliary reservoir pressure, the movement of the triple valve device 1 to release position is facilitated and made more positive.

When the brake pipe pressure acting in the triple valve piston chamber 12 becomes increased to a predetermined degree above the reduced auxiliary reservoir pressure in valve chamber 14, the piston 13 is operated to shift the slide valves 15 and 16 to release position, in which the brake equipment is recharged and fluid under pressure is released from the brake cylinder 7 in the same manner as hereinbefore described.

It will be noted that the back dump of the fluid under pressure from the brake cylinder and auxiliary reservoir to the brake pipe occurs through passages 94 and 96 which are connected past the check valve 95, said check valve being provided to prevent direct flow of fluid from the emergency reservoir to the brake cylinder in effecting an emergency application of the brakes.

The check valve 140, which is subject to the pressure of a light seating spring 141, prevents back flow from the brake pipe to the brake cylinder, when the brake pipe pressure is increased to a higher pressure than the existing pressure in the brake cylinder at the opposite side of the check valve.

With the emergency valve device in back dump position, fluid flows from piston chamber 25 through passage 101, past check valve 102, and through passage 103 to valve chamber 27 and the quick action reservoir 29, and when the pressure in said chamber and reservoir is increased to substantially equal brake pipe pressure, the spring 39 shifts the stem 32, piston 24 and slide valves 30 and 31 back to normal position, as shown in the drawing.

It will now be evident that according to my invention, means are provided for securing a build up of brake cylinder pressure in three stages, both in service and emergency brake applications, and in which the slack run-in delay period for the slow build up of brake cylinder pressure following the initial inshot of fluid pressure on cars at the head end of the train, is made shorter in an emergency application than in a service application, and that the rate of build up of brake sylinder pressure during the delay period is faster in an emergency application than in a service application. Thus advantage is taken of the fact that in an emergency application, the brakes are applied on cars at the rear end of the train in less time from the initiation of the brake application on cars at the front end of the train, than is the case in a service application of the brakes, which fact permits the brakes to be applied more quickly and with greater force on cars at the head end in an emergency application than in a service application, without causing the slack to run in at a dangerous rate.

The subject matter relating to the feature of venting fluid under pressure from the auxiliary reservoir and brake cylinder to the brake pipe after an application of the brakes in order to facilitate the release of the brakes is broadly claimed in my pending applications, Serial No. 487,988, filed October 11, 1930, and Serial No. 612,465, filed May 20, 1932, and the subject matter relating to the controlled build-up of brake cylinder pressure in effecting an application is broadly claimed in my aforementioned pending application, Serial No. 612,465.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake for a vehicle, the combination with a brake pipe and a brake cylinder, of a triple valve device operative upon a reduction in brake pipe pressure to establish a communication through which fluid under pressure is adapted to be supplied to said brake cylinder, means operative according to the position of the vehicle in a train for controlling the rate at which fluid flows through said communication to said brake cylinder, valve means controlled by brake cylinder pressure for changing the rate at which fluid flows through said communication to said brake cylinder, an emergency valve device operative upon a reduction in brake pipe pressure to supply fluid to said communication and to said brake cylinder, and other means for controlling the rate at which fluid flows from said emergency valve device to said brake cylinder.

2. In a fluid pressure brake for a vehicle, the combination with a brake pipe and a brake cylinder, of a triple valve device operative upon a reduction in brake pipe pressure to establish a communication through which fluid under pressure is adapted to be supplied to said brake cylinder, means operative according to the position of the vehicle in a train for controlling the rate at which fluid flows through said communication to said brake cylinder, valve means controlled by brake cylinder pressure for changing the rate at which fluid flows through said communication to said brake cylinder, an emergency valve device operative upon a reduction in brake pipe pressure to supply fluid to said communication and to said brake cylinder, other means for controlling the rate at which fluid flows from said emergency valve device to said brake cylinder, and a check valve for preventing flow of fluid from said communication to the communication to which the emergency valve device supplies fluid.

3. In a fluid pressure brake, the combination with a brake pipe, a brake cylinder, and a brake controlling valve means comprising a triple valve device, an emergency valve device, and a casing having a passage connected to said brake cylinder, a triple valve passage connecting the triple valve device to the brake cylinder passage, an emergency valve passage connecting the emergency valve device to the triple valve passage and to the brake cylinder passage, said triple valve device being operative upon a reduction in brake pipe pressure to supply fluid to the triple valve passage, means for controlling the flow of fluid from the triple valve passage to the brake cylinder passage, said emergency valve device being operative upon a reduction in brake pipe pressure to supply fluid to the emergency valve passage, means for controlling the flow of fluid from said emergency valve passage to said brake cylinder passage, a check valve for preventing flow of fluid from the triple valve passage to the emergency valve passage, and valve means controlled by the pressure of fluid in the triple valve passage and brake cylinder passage for establishing another communication between the two last mentioned passages.

4. In a fluid pressure brake for a vehicle, the combination with a brake pipe and a brake cylinder, of a valve device operative upon a reduction in brake pipe pressure to supply fluid under pressure to said brake cylinder, means operative according to the position of the vehicle in a train for controlling the rate of supply of fluid from said valve device to said brake cylinder, valve means operative upon a reduction in brake pipe pressure to supply fluid under pressure to said brake cylinder independently of said valve device, and other means for controlling the rate of supply of fluid from said valve means to said brake cylinder, said valve means being operative upon a predetermined increase in brake pipe pressure to establish a communication for venting fluid under pressure from said brake cylinder to said brake pipe independently of both of said means.

5. In a fluid pressure brake for a vehicle, the combination with a brake pipe, a brake cylinder, an auxiliary reservoir and an emergency reservoir, of a triple valve device operative upon a reduction in brake pipe pressure to supply fluid from said auxiliary reservoir to a passage communicating with said brake cylinder, means operative according to the position of the vehicle in a train for controlling the flow of fluid from said triple valve device to the brake cylinder passage, an emergency valve device operative upon a reduction in brake pipe pressure to supply fluid under pressure from said emergency reservoir to a passage having two communications with said brake cylinder passage, means for controlling flow of fluid from the last mentioned passage to the brake cylinder through one of said two communications and a check valve in the other of said two communications, said emergency valve device being operative upon an increase in brake pipe pressure to vent fluid from said brake cylinder to said brake pipe by way of said check valve.

6. In a fluid pressure brake, the combination with a brake pipe, brake cylinder, and brake controlling valve means operative upon a service rate of reduction in brake pipe pressure to supply fluid under pressure to the brake cylinder to effect a service application of the brakes and upon an emergency rate of reduction in brake pipe pressure to supply fluid under pressure to the brake cylinder to effect an emergency application of the brakes, of means operative both in effecting a service and an emergency application of the brakes for supplying fluid under pressure to the brake cylinder on cars at the head end of the train at a lesser rate than on cars at the rear end of the train, and means for supplying fluid under pressure to the brake cylinder on cars at the head end of the train at a lesser rate in a service application than in an emergency application of the brakes.

CLYDE C. FARMER.